United States Patent
Hassibi et al.

(10) Patent No.: US 6,944,236 B2
(45) Date of Patent: Sep. 13, 2005

(54) METHOD OF MULTIPLE-ANTENNA WIRELESS COMMUNICATION USING SPACE-TIME CODES

(75) Inventors: Babak Hassibi, Pasadena, CA (US); Bertrand M Hochwald, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 816 days.

(21) Appl. No.: 09/902,847

(22) Filed: Jul. 11, 2001

(65) Prior Publication Data

US 2002/0044611 A1 Apr. 18, 2002

Related U.S. Application Data

(60) Provisional application No. 60/224,685, filed on Aug. 11, 2000.

(51) Int. Cl.[7] .................................................. H04L 1/02
(52) U.S. Cl. ........................................ 375/267; 375/299
(58) Field of Search ................................. 375/146, 260, 375/267, 295, 299; 455/59, 91, 101, 103; 370/203, 204, 208, 437, 464, 465; 343/751, 893

(56) References Cited

U.S. PATENT DOCUMENTS

| | | | | |
|---|---|---|---|---|
| 6,560,295 B1 | * | 5/2003 | Hammons et al. | 375/299 |
| 6,865,237 B1 | * | 3/2005 | Boariu et al. | 375/295 |

* cited by examiner

*Primary Examiner*—Dac V. Ha
(74) *Attorney, Agent, or Firm*—M. I. Finston

(57) ABSTRACT

In a method of wireless transmission, space time matrices are used to spread the transmission of data over two or more transmit antennas and/or over two or more symbol intervals. Initially, blocks of data are encoded as symbols, each being a complex amplitude selected from a symbol constellation. A finite set of space-time matrices, referred to as "dispersion matrices," is predetermined. In transmission, a group of symbols are transmitted concurrently. Each of the symbols to be transmitted is multiplied by a respective dispersion matrix. Thus, a composite matrix, proportional to a sum of dispersion matrices multiplied by their corresponding symbols, is modulated onto a carrier and transmitted. In reception, knowledge of the dispersion matrices is used to recover the transmitted symbols from the received signals corresponding to the composite matrix that was transmitted.

10 Claims, 3 Drawing Sheets

METHOD OF MULTIPLE-ANTENNA WIRELESS COMMUNICATION USING SPACE-TIME CODES

This application claims benefit of U.S. Provisional Ser. No. 60/224,685 filed Aug. 11, 2000.

FIELD OF THE INVENTION

This invention relates to wireless radiofrequency communication, and more specifically, to methods of signal modulation for communication using multiple-antenna arrays.

ART BACKGROUND

In wireless communication, certain advantages are offered by the use of multiple antenna elements for transmission, whether with one or with more than one receiving antenna element. These advantages include the potential to mitigate fading effects, and the potential to increase data transmission rates in a propagation channel of given characteristics.

A variety of schemes have been proposed for modulating data to be transmitted from a multiple-element array. In some of these schemes, referred to generally as space-time modulation, the data are transmitted in the form of codewords distributed in space—i.e., across the antenna array—and in time. Such a codeword comprises a plurality of complex-valued amplitudes modulated onto a carrier wave.

Within a given time interval, referred to as a symbol interval, a complex amplitude (which might be zero) is transmitted from each element of the antenna array. Conversely, at each element of the array, a sequence of amplitudes is transmitted over a succession of symbol intervals. The concurrent transmission of amplitudes from the elements of the array during one symbol interval is referred to as a channel use.

A codeword of the kind described above can be represented by a matrix. The respective entries of the matrix are proportional to the complex amplitudes to be transmitted. Each column of the matrix corresponds, e.g., to a respective transmitting antenna, and each row corresponds, e.g., to a respective symbol interval.

A variety of schemes have also been proposed for recovering the transmitted data from signals received by a single receiving antenna or a multiple-element receiving antenna array. Mathematical models of the propagation channel between the transmitting and receiving antennas generally include a matrix of channel coefficients, each such coefficient relating the amplitude received at a given element of the receiving array to the amplitude transmitted from a given element of the transmitting array. In some of the known reception schemes, the channel coefficients are assumed to be known, exemplarily from measurements made using pilot signals.

When the channel coefficients are known, methods of signal recovery can be used that effectively invert the channel matrix. Both direct and indirect methods are known for effectively inverting the channel matrix. Among the indirect methods are Maximum Likelihood (ML) detectors. Given an estimate of the channel matrix and a received signal, an ML detector computes a likelihood score for each of a plurality of candidate codewords, and selects that candidate codeword that yields the highest score. Because of noise and uncertainties in the channel coefficients due to fading, received signals are generally corrupted to a greater or lesser extent. Thus, it is advantageous to use codewords for which the likelihood scores have high discriminating power, even in the presence of fading and noise.

One known method of space time modulation is V-BLAST. In V-BLAST, an initial stream of data is apportioned into separate sequences of amplitudes, each of which is independently transmitted from one of the transmitting antenna elements. In effect, the codeword can be represented by a row vector having M entries, where M is the number of transmitting antennas. The single row represents a single symbol interval. Typically, a new codeword is transmitted in each symbol interval. The independent sequence of amplitudes transmitted by each antenna can be referred to as a substream because it contains a respective subset of the data in the initial data stream.

Several schemes have been described for recovering V-BLAST signals. Some such schemes use ML detectors. According to another such scheme, the entries of the transmitted vector are recovered one-by-one, with each successive recovery utilizing the results of the previous recoveries. One example of such a scheme is described in the co-pending U.S. patent application Ser. No. 09/438,900, filed Nov. 12, 1999 by B. Hassibi under the title "Method and Apparatus for Receiving Wireless Transmissions Using Multiple-Antenna Arrays," and commonly assigned herewith.

V-BLAST is advantageous in that it can be used for communication at relatively high data rates without excessive computational complexity in the decoding of the received signals. However, the decoding schemes that offer the lowest complexity require that the number N of receiving antennas must equal or exceed the number M of transmitting antennas. Such a requirement is disadvantageous when, for example, a large installation such as a base station is transmitting to a small installation such as a hand-held mobile wireless terminal.

Another method of space time modulation is described in S. M. Alamouti, "A simple transmitter diversity scheme for wireless communications," *IEEE J. Sel. Area Comm.* (October 1998) 1451–1458. In the Alamouti scheme, each codeword is distributed over two transmit antennas and two symbol intervals. Each codeword is determined by two distinct complex amplitudes, each belonging to a respective substream. In the first symbol interval, one of the amplitudes is transmitted from the first antenna, and the other amplitude is transmitted from the second antenna. In the second symbol interval, the complex amplitudes are interchanged between the two antennas, one of the complex amplitudes changes sign, and the complex conjugates of the resulting amplitudes are transmitted. Significantly, when a codeword of this kind is expressed in the form of a matrix, the matrix has orthogonal columns.

One drawback of the Alamouti scheme is that it makes the most efficient use of the theoretical information capacity of the propagation channel only when there is a single receiving antenna. The channel capacity is used less efficiently when further receiving antennas are added. Thus, gains that might otherwise be expected in data rate and fading resistance from multiple-antenna receiving arrays are not fully realized.

Extensions of the Alamouti scheme to more than two transmitting antennas and more than two symbol intervals per codeword are also known. The Alamouti scheme and its extensions are referred to generally as orthogonal designs because the matrices that represent the codewords are required to be orthogonal; that is, each column of such a matrix is orthogonal to every other column of the matrix. A further requirement of orthogonal designs is that for a matrix to represent a codeword, all columns of the matrix must have the same energy. In this regard, the "energy" of a column is the scalar product of that column with its complex conjugate.

Until now, there has been an unmet need for a space-time modulation scheme that can handle high data rates with relatively low decoding complexity and that uses the potentially available channel capacity with relatively high efficiency for any combination (M, N) of transmission and reception antennas.

SUMMARY OF THE INVENTION

We have invented such a scheme. Our scheme uses space-time matrices to spread the transmission of data over two or more transmit antennas and/or over two or more symbol intervals. (A "matrix" in this regard may consist of a single column or a single row.) Initially, blocks of data are encoded as complex amplitudes selected from a finite set of such amplitudes. (Complex values include those that are pure real and pure imaginary.) We refer to, each selected complex amplitude as a "symbol," and we refer to the finite set as a "constellation." If the constellation has r elements, then each symbol carries $\log_2 r$ bits of information.

The constellation is predetermined, and also a fixed, finite set of space-time matrices is predetermined. We refer to the matrices in this set as "dispersion matrices." In the following discussion of an exemplary embodiment of the invention, we let Q represent the number of dispersion matrices in the fixed, finite set.

In transmission, Q symbols are transmitted concurrently. Each of the Q symbols to be transmitted is multiplied by a respective dispersion matrix. A composite matrix, proportional to the sum of all Q dispersion matrices multiplied by their corresponding symbols, is transmitted according to the principles of space-time modulation described above.

The elements of the dispersion matrices are advantageously selected according to a procedure that seeks to drive the rate at which data can be sent and received toward the information-theoretic channel capacity.

We have found that orthogonal designs fall significantly short of achieving the information-theoretic capacity of the channel whenever there are more than two transmitting antennas or more than one receiving antenna.

In contrast to transmission methods using orthogonal designs, our method does not constrain the columns of the transmitted, composite matrix to be orthogonal or to have equal energies.

In reception, knowledge of the dispersion matrices is used to recover the Q symbols from the received signals corresponding to the composite matrix that was transmitted.

In a broader aspect of the invention, the total number of dispersion matrices is 2Q. Half of the dispersion matrices are used to spread the real parts of the Q symbols, and the other half are used to spread the imaginary parts of the Q symbols. Alternatively, half of the dispersion matrices are used to spread the Q symbols, and the other half are used to spread the complex conjugates of the Q symbols.

DETAILED DESCRIPTION

Certain general features of space-time modulation will now be described with reference to FIG. 1. Let there be M transmit antennas 10.1–10.M, and N receive antennas 15.1–15.M. Let the propagation channel be reasonably well modeled as a narrow-band, flat-fading channel that is effectively constant and known to the receiver for a duration whose length is at least T symbol intervals. The transmitted signal can then be written as a T×M matrix S that governs the transmission over the M antennas during the interval.

Figure 1:
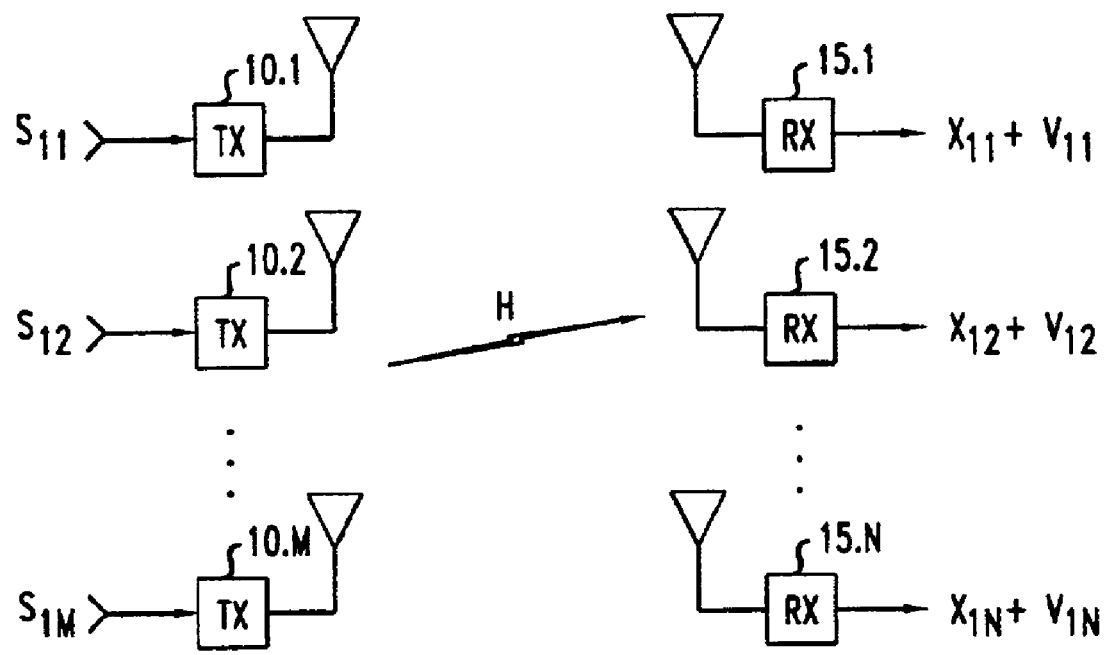
FIG. 1 is a conceptual drawing of a multiple-antenna wireless communication system of the prior art.

Illustrated schematically in FIG. 1 is the transmission of the first row of the signal matrix S. During the first of T symbol intervals, the complex amplitude $S_{11}$ is modulated onto a radiofrequency carrier and transmitted from antenna 10.1, and each of the remaining complex amplitudes $S_{12}, \ldots, S_{1M}$ is modulated onto the carrier and transmitted from a corresponding antenna 10.2, ..., 10.M.

At the receiving end, all of the transmitted amplitudes are intercepted by each of the N receiving antennas 15.1–15.N, with varying attenuations and phase delays determined by the characteristics of the propagation channel, which is described by the matrix H of channel coefficients. Thus, after demodulation to baseband, the signal from each receiving antenna resulting from each channel use is a linear combination of the amplitudes $S_{12}, \ldots, S_{1M}$, with complex weights determined by the propagation channel, plus additive noise. The outputs over T symbol intervals, corresponding to the response of the receiver to the transmission of matrix S, can be represented as a T×N matrix X+V, where X contains the linear combinations described above, and V contains the additive noise. Illustrated schematically in FIG. 1 is the receipt of the first row of matrix X+V.

Figure 2:
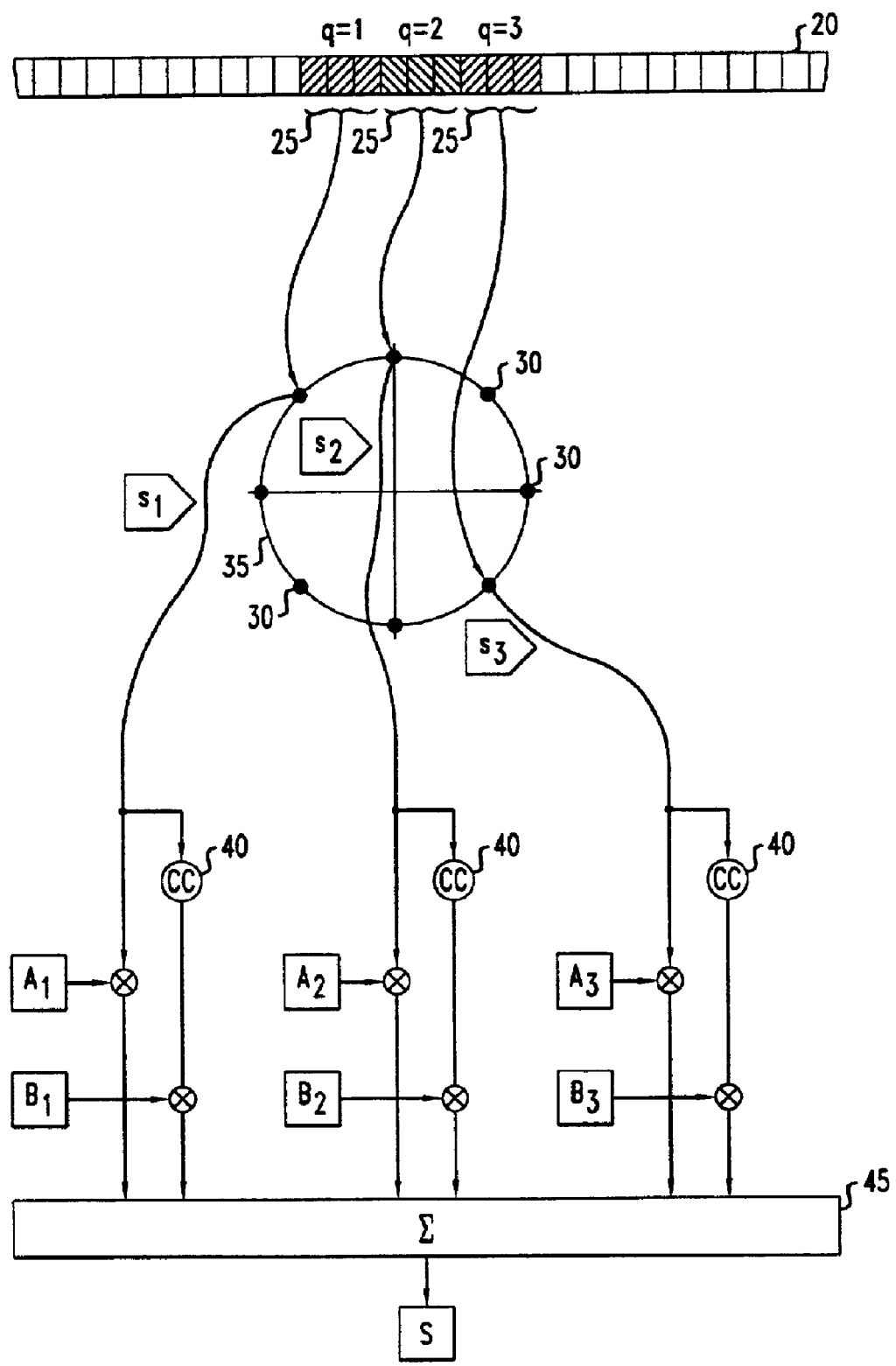
FIG. 2 is a conceptual diagram showing the operation of linear dispersion coding according to the invention in some embodiments.

Certain features of the present invention will now be described with reference to FIG. 2. The steps shown in FIG. 2 are merely illustrative. Those skilled in the art will appreciate that numerous alternative procedures will bring about equivalent results, and thus fall within the scope and spirit of the present invention.

A sequence 20 of data, exemplarily a binary sequence of 0's and 1's, is parsed into substreams. In the example shown, the number Q of substreams is 3, and each block of data in a substream carries three bits of information. A block 25 of data from each substream is mapped to a symbol 30 selected from constellation 35. The illustrative constellation shown in FIG. 2 is a set of eight uniformly spaced points on the unit circle in the complex plane. More typically, the constellation will be an r-PSK or r-QAM constellation.

In the example shown, the image of each block of data is a respective one of the symbols $s_1, s_2, s_3$. Each of these symbols directly multiplies a respective dispersion matrix $A_1, A_2, A_3$. In process 40, the complex conjugate is taken of each symbol, thus generating a further symbol. Each of the resulting complex conjugates multiplies a respective dispersion matrix $B_1, B_2, B_3$. In process 45, which is represented in the figure as a summation element, the signal matrix S is constructed by summing the six dispersion matrices, with each weighted by its corresponding symbol.

More generally, Q symbols $s_1, \ldots, s_Q$ are selected from an appropriate constellation. The signal matrix S is constructed according to:

$$S = \sum_{q=1}^{Q} (\alpha_q A_q + j\beta_q B_q), \tag{1}$$

where $$s_q = \alpha_q + j\beta_q, \quad q = 1, \ldots Q. \tag{2}$$

We refer to a code of this kind as a rate $R = (Q/T)\log_2 r$ linear dispersion (LD) code.

The code is completely specified by the fixed T×M complex matrices $A_1, \ldots, A_Q$ and $B_1, \ldots, B_Q$, which we refer to as dispersion matrices. Each individual codeword is determined by the scalars $\{s_1, \ldots, s_Q\}$.

Alternatively, S is expressed by:

$$S = \sum_{q=1}^{Q} (s_q C_q + s_q^* D_q), \tag{3}$$

where the $C_q$ and $D_q$ are the fixed T×M dispersion matrices.

In specific implementations, one or more of the $A_q$ or $B_q$, or one or more of the $C_q$ or $D_q$, matrices could be zero. In fact, it is essential only that there be at least Q non-zero dispersion matrices.

As noted above, in a narrow-band, flat-fading, multi-antenna communication system with M transmit and N receive antennas, the transmitted and received signals are related by a linear relationship. We here represent that relationship by:

$$x = \sqrt{\frac{\rho}{M}} Hs + v, \tag{4}$$

where the complex N-dimensional vector x denotes the vector of complex received signals during any given channel use, the complex M-dimensional vector s denotes the vector of complex transmitted signals, the complex N×M matrix H denotes the channel matrix, and the complex N-dimensional vector v denotes additive noise which, for purposes of theoretical analysis, is assumed to be spatially and temporally white; i.e., to be CN (0,1) (zero-mean, unit-variance, complex-Gaussian) distributed. For analytical purposes, the channel matrix H and transmitted vector s are assumed to have unit variance entries, implying that E tr HH*=MN and Es*s=M, where E (.) denotes the statistical expected value.

Assuming that the quantities H, s, and v are random and independent, the normalization $$\sqrt{\frac{\rho}{M}}$$

in Eq. (4) will insure that ρ is the signal-to-noise ratio (SNR) at the receiver independently of M. For analytical purposes, it is also often (although not invariably) assumed that the channel matrix H also has CN (0,1) entries.

The entries of the channel matrix are assumed to be known to the receiver but not to the transmitter. This assumption is reasonable if training or pilot signals are sent to learn the channel, which is then constant for some coherence interval. The coherence interval of the channel is preferably large compared to M.

When the channel is effectively constant for at least T channel uses we may write for each symbol interval t, $$x_t = \sqrt{\frac{\rho}{M}} Hs_t + v_t, \quad t = 1, \ldots, T, \tag{5}$$

so that defining $X^T = [x_1 x_2 \ldots x_T]$, $S^T = [s_1 s_2 \ldots s_T]$ and $V^T = [v_1 v_2 \ldots v_T]$, we obtain $$X^T = \sqrt{\frac{\rho}{M}} HS^T + V^T. \tag{6}$$

It is generally more convenient to write this equation in its transposed form $$X = \sqrt{\frac{\rho}{M}} SH + V, \tag{7}$$

where we have omitted the transpose notation from H and simply redefined this matrix to have dimension M×N. The complex T×N matrix X is the received signal, the complex T×M matrix S is the transmitted signal, and the complex T×N matrix V is the additive CN (0,1) noise. In X, S, and V, time runs vertically and space runs horizontally.

We note that, in general, the number of T×M matrices S needed in a codebook can be quite large. If the rate in bits/channel use is denoted R, then the number of matrices is $2^{RT}$. For example, with M=4 transmit and N=2 receive antennas the channel capacity at ρ=20 dB (with CN (0,1) distributed H) is more than 12 bits/channel use. Even with a relatively small block size of T=4, we need $2^{48} \approx 10^{14}$ matrices at rate R=12.

LD codes can readily generate the very large constellations that are needed. Moreover, because of their structure, they also allow efficient real-time decoding.

Decoding. An important property of the LD codes is their linearity in the variables $\{\alpha_q, \beta_q\}$, leading to efficient decoding schemes such as those used in connection with V-BLAST. To see this, it is useful to write the block equation $$X = \sqrt{\frac{\rho}{M}} SH + V = \sqrt{\frac{\rho}{M}} \sum_{q=1}^{Q} (\alpha_q A_q + j\beta_q B_q) H + V \tag{8}$$

in a more convenient form. We decompose the matrices in Eq. (8) into their real and imaginary parts to obtain $$X_R + jX_I = \tag{9}$$

$$\sqrt{\frac{\rho}{M}} \sum_{q=1}^{Q} [\alpha_q (A_{R,q} + jA_{I,q}) + j\beta(B_{R,q} + jB_{I,q})](H_R + jH_I) +$$

$$V_R + jV_I.$$

Denoting the columns of $X_R$, $X_I$, $H_R$, $H_I$, $V_R$, and $V_I$ by $x_{R,n}$, $x_{I,n}$, $h_{R,n}$, $h_{I,n}$, $v_{R,n}$, and $v_{I,n}$ where $n=1, \ldots, N$, we form the single real system of equations $$\begin{bmatrix} x_{R,1} \\ x_{I,1} \\ \vdots \\ x_{R,N} \\ x_{I,N} \end{bmatrix} = \sqrt{\frac{\rho}{M}} \tilde{H} \begin{bmatrix} \alpha_1 \\ \beta_1 \\ \vdots \\ \alpha_Q \\ \beta_Q \end{bmatrix} + \begin{bmatrix} v_{R,1} \\ v_{I,1} \\ \vdots \\ v_{R,N} \\ v_{I,N} \end{bmatrix}, \quad (10)$$

where the equivalent 2NT×2Q real channel matrix is given by $$H = \begin{bmatrix} \begin{bmatrix} A_{R,1} & -A_{I,1} \\ A_{I,1} & A_{R,1} \end{bmatrix} \begin{bmatrix} h_{R,1} \\ h_{I,1} \end{bmatrix} & \begin{bmatrix} -B_{I,1} & -B_{R,1} \\ B_{R,1} & -B_{I,1} \end{bmatrix} \begin{bmatrix} h_{R,1} \\ h_{I,1} \end{bmatrix} & \cdots & \begin{bmatrix} A_{R,Q} & -A_{I,Q} \\ A_{I,Q} & A_{R,Q} \end{bmatrix} \begin{bmatrix} h_{R,1} \\ h_{I,1} \end{bmatrix} & \begin{bmatrix} -B_{I,Q} & -B_{R,Q} \\ B_{R,Q} & -B_{I,Q} \end{bmatrix} \begin{bmatrix} h_{R,1} \\ h_{I,1} \end{bmatrix} \\ \vdots & \vdots & \ddots & \vdots & \vdots \\ \begin{bmatrix} A_{R,1} & -A_{I,1} \\ A_{I,1} & A_{R,1} \end{bmatrix} \begin{bmatrix} h_{R,N} \\ h_{I,N} \end{bmatrix} & \begin{bmatrix} -B_{I,1} & -B_{R,1} \\ B_{R,1} & -B_{I,1} \end{bmatrix} \begin{bmatrix} h_{R,N} \\ h_{I,N} \end{bmatrix} & \cdots & \begin{bmatrix} A_{R,Q} & -A_{I,Q} \\ A_{I,Q} & A_{R,Q} \end{bmatrix} \begin{bmatrix} h_{R,N} \\ h_{I,N} \end{bmatrix} & \begin{bmatrix} -B_{I,Q} & -B_{R,Q} \\ B_{R,Q} & -B_{I,Q} \end{bmatrix} \begin{bmatrix} h_{R,N} \\ h_{I,N} \end{bmatrix} \end{bmatrix} \quad (11)$$

We now introduce the following definitions:

$$\begin{bmatrix} x_{R,1} \\ x_{I,1} \\ \vdots \\ x_{R,N} \\ x_{I,N} \end{bmatrix} \overset{\Delta}{=} \tilde{x}; \quad \begin{bmatrix} \alpha_1 \\ \beta_1 \\ \vdots \\ \alpha_Q \\ \beta_Q \end{bmatrix} \overset{\Delta}{=} \tilde{s}; \quad \begin{bmatrix} v_{R,1} \\ v_{I,1} \\ \vdots \\ v_{R,N} \\ v_{I,N} \end{bmatrix} \overset{\Delta}{=} v. \quad (12)$$

We have a linear relation between the input and output vectors $\tilde{s}$ and $\tilde{x}$, respectively:

$$\tilde{x} = \sqrt{\frac{\rho}{M}} \tilde{H}\tilde{s} + v, \quad (13)$$

where the equivalent channel $\tilde{H}$ is known to the receiver because the original channel H, and the dispersion matrices $\{A_q, B_q\}$ are all known to the receiver. (Those skilled in the art will appreciate that an equivalent treatment can be formulated in terms of the dispersion matrices $\{C_q, D_q\}$ in place of the matrices $\{A_q, B_q\}$. The matrices $\{C_q, D_q\}$ are defined by Eq. (3), above.)

The receiver simply uses Eq. (11) to find the equivalent channel. The system of equations between transmitter and receiver is not undetermined as long as $Q \leq NT$.

We may therefore use any decoding technique already known for use, e.g., with V-BLAST, such as successive nulling and cancellation, its efficient square-root implementation, or sphere decoding. The most efficient implementations of these schemes generally require $O(Q^3)$ computations and have roughly constant complexity in the size of the signal constellation r. Sphere decoding, which is an efficient species of maximum-likelihood decoding, will in at least some cases be particularly advantageous.

Design of the dispersion matrices. In a broad sense, the mutual information between the input vector $\tilde{s}$ and the output vector $\tilde{x}$ is a measure of channel capacity as constrained by our definition of the "equivalent channel," and contingent on the choice of dispersion matrices. When maximized, the mutual information expresses the maximum data rate achievable through the use of linear dispersion codes as described here, for given values of Q and T and for given numbers of transmit and receive antennas.

For purposes of the exemplary design method to be described below, we now define the mutual information between the input vector $\tilde{s}$ and the output vector $\tilde{x}$ as $$\frac{1}{2T} E \log \det\left(I_{2NT} + \frac{\rho}{M} \tilde{H}\tilde{H}^T\right),$$

where E (.) denotes the statistical expected value, $I_{2NT}$ is the identity matrix of dimension 2NT, and $\tilde{H}^T$ is the transpose of the matrix $\tilde{H}$.

As a general practice, we find it useful to take Q=min(M, N)T since this tends to maximize the mutual information between $\tilde{s}$ and $\tilde{x}$ while still having some coding effects.

We choose $\{A_q, B_q\}$ to maximize the mutual information between $\tilde{s}$ and $\tilde{x}$. We formalize the design criterion as follows.

1. Choose $Q \leq NT$ (typically, Q=min(M,N)T).
2. Choose $\{A_q, B_q\}$ that solve the optimization problem $$C_{LD}(\rho, T, M, N) = \max_{A_q, B_q, q=1,\ldots Q} \frac{1}{2T} E \log \det\left(I_{2NT} + \frac{\rho}{M} \tilde{H}\tilde{H}^T\right) \quad (14)$$

subject to one of the following constraints $$\sum_{q=1}^{Q} (tr A_q^* A_q + tr B_q^* B_q) = 2TM \quad (i)$$

$$tr A_q^* A_q = tr B_q^* B_q = \frac{TM}{Q}, q = 1, \ldots Q \quad (ii)$$

$$A_q^* A_q = B_q^* B_q = \frac{T}{Q} I_M, q = 1, \ldots Q \quad (iii)$$

where $\tilde{H}$ is given by Eq. (11) with the entries of $h_{R,n}$ and $h_{I,n}$ having independent N(0,½) entries. (In our theoretical studies, we have assumed that the channel matrix H has independent CN(0,1) entries. However, our mutual information criterion is also readily applied for designing linear dispersion codes appropriate to channels described by other statistical distributions.)

The problem expressed by Eq. (14) can be solved subject to any of the constraints (i)–(iii). Constraint (i) is simply the power constraint of Eq. (8) that ensures E tr SS*=TM. Constraint (ii) is more restrictive and ensures that each of the transmitted signals $\alpha_q$ and $\beta_q$ are transmitted with the same overall power from the M antennas during the T channel uses. Finally, constraint (iii) is the most stringent, since it forces the signals $\alpha_q$ and $\beta_q$ to be dispersed with equal energy in all spatial and temporal directions.

We have empirically found that of two codes with similar mutual informations, the one satisfying the more stringent constraint performs better.

The constraints (i)–(iii) are convex in the dispersion matrices $\{A_q, B_q\}$. However, the cost function $$\frac{1}{2T} E \log \det\left(I_{2NT} + \frac{\rho}{M} \tilde{H} \tilde{H}^T\right)$$

is neither concave nor convex in the variables $\{A_q, B_q\}$. Therefore, it is possible that Eq. (14) has local maxima. Nevertheless, we have been able to solve Eq. (14) with relative ease using gradient-based methods and it does not appear that local minima pose a great problem.

The block length T is essentially also a design variable. Although it must be chosen shorter than the coherence time of the channel, it can be varied to help the optimization of Eq. (14). We have found that choosing $M \leq T \leq 2M$ often yields good performance.

It should be noted that any code designed for a given number of receive antennas is also readily used for a greater number of receive antennas.

Figure 3:
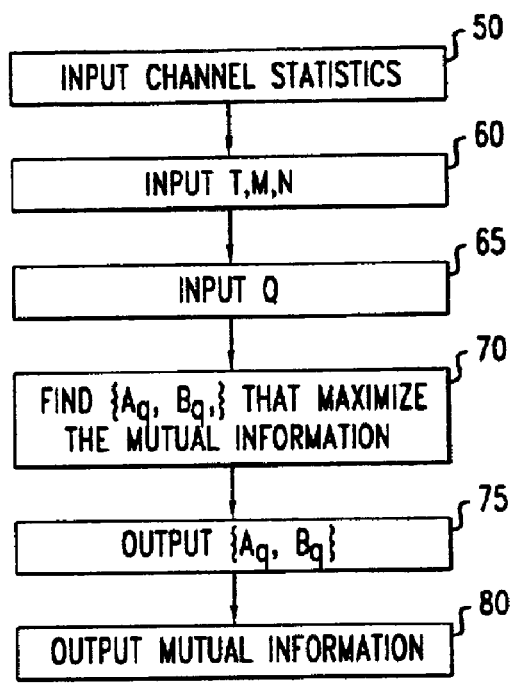
FIG. 3 is a flowchart illustrating the application of a criterion on the maximality of mutual information for designing a linear dispersion code according to the invention in some embodiments.

With reference to FIG. 3, there is input at block 50 of that figure a statistical description of the propagation channel H. At block 60, the block length T, the size M of the transmit array, and the size N of the receiving array are provided to the processor. At block 65, the number Q is specified. At block 70, the optimization problem is solved to determine the set of 2Q dispersion matrices that maximizes the mutual information. At block 75 the processor outputs the dispersion matrices and the equivalent channel matrix $\tilde{H}$. At block 80, a calculated value of the mutual information is output by the processor.

EXAMPLE

We will present an orthogonal design of block length T=4 for M=3 transmit antennas, and will then compare the orthogonal design to a linear dispersion code for M=3 transmit antennas and N=1 receive antennas. The orthogonal design is written in terms of $\{\alpha_q\}$ and $\{\beta_q\}$ as $$S = \sqrt{\frac{4}{3}} \begin{bmatrix} \alpha_1 + j\beta_1 & \alpha_2 + j\beta_2 & \alpha_3 + j\beta_3 \\ -\alpha_2 + j\beta_2 & \alpha_1 - j\beta_1 & 0 \\ -\alpha_3 + j\beta_3 & 0 & \alpha_1 - i\beta_1 \\ 0 & -\alpha_3 + j\beta_3 & \alpha_2 - i\beta_2 \end{bmatrix} \quad (15)$$

It turns out that this orthogonal design is also an LD code because, as we have found, it is a solution to Eq. (14) for T=4 and Q=3. It achieves a mutual information of 5.13 bits/channel use at $\rho$=20 dB, whereas the channel capacity is 6.41 bits/channel use.

To find a better LD code, we first observe that it is advantageous for Q to obey the constraint $Q \leq NT$, with N=1 and T=4. Therefore $Q \leq 4$, and we choose Q=4. After optimizing (14) using a gradient-based search, we find:

$$S = \begin{bmatrix} \alpha_1 + \alpha_3 + j\left[\frac{\beta_2 + \beta_3}{\sqrt{2}} + \beta_4\right] & \frac{\alpha_2 - \alpha_4}{\sqrt{2}} j\left[\frac{\beta_1}{\sqrt{2}} + \frac{\beta_2 - \beta_3}{2}\right] & 0 \\ \frac{-\alpha_2 + \alpha_4}{\sqrt{2}} - j\left[\frac{\beta_1}{\sqrt{2}} + \frac{\beta_2 - \beta_3}{2}\right] & \alpha_1 - j\beta_2 + \frac{\beta_3}{\sqrt{2}} & -\frac{\alpha_2 + \alpha_4}{\sqrt{2}} + j\left[\frac{\beta_1}{\sqrt{2}} - \frac{\beta_2 - \beta_3}{2}\right] \\ 0 & \frac{\alpha_2 + \alpha_4}{\sqrt{2}} + j\left[\frac{\beta_1}{\sqrt{2}} - \frac{\beta_2 - \beta_3}{2}\right] & \alpha_1 - \alpha_3 + j\left[\frac{\beta_2 + \beta_3}{\sqrt{2}} - \beta_4\right] \\ \frac{\alpha_2 - \alpha_4}{\sqrt{2}} + j\left[\frac{\beta_1}{\sqrt{2}} + \frac{\beta_2 - \beta_3}{2}\right] & -\alpha_3 + j\beta_4 & -\frac{\alpha_2 + \alpha_4}{\sqrt{2}} + j\left[\frac{\beta_1}{\sqrt{2}} - \frac{\beta_2 - \beta_3}{2}\right] \end{bmatrix} \quad (16)$$

Figure 4:
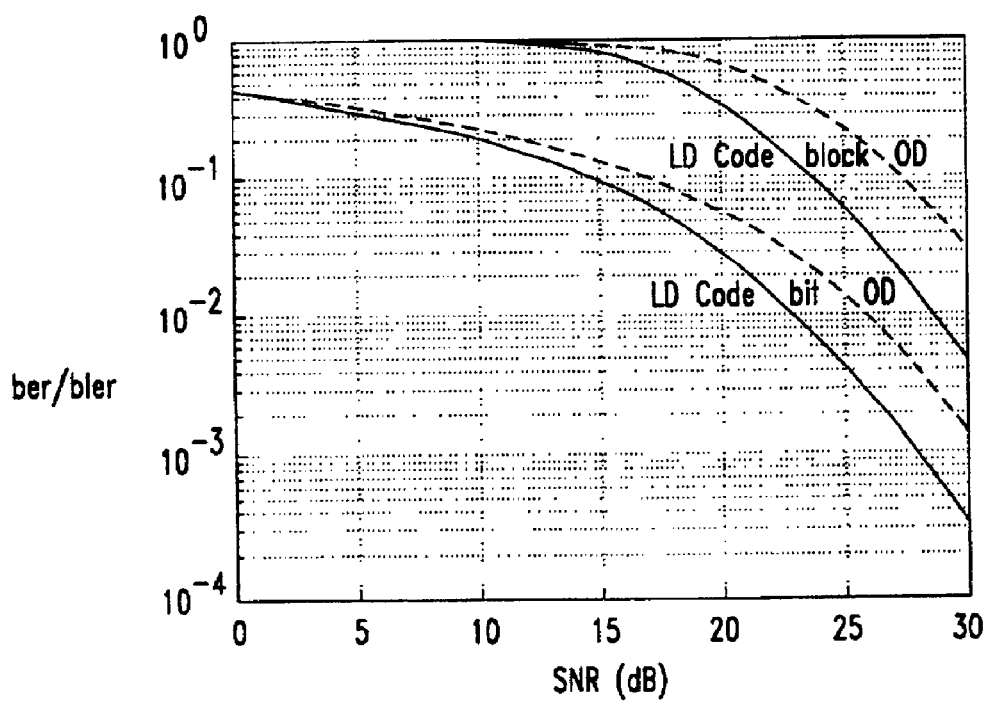
FIG. 4 is a graph showing the theoretical performance of certain coding techniques in terms of bit-error rate (ber) or block-error rate (bler) as a function of signal-to-noise ratio (SNR). Compared in the figure are the results of theoretical modeling of a linear dispersion code (solid curves labeled "LD Code") and an orthogonal design (broken curves labeled "OD").

This code has a mutual information of 6.25 bits/channel use at $\rho$=20 dB, which is most of the channel capacity. FIG. 4 compares the performance of the orthogonal design of Eq. (15) with the LD code of Eq. (16) at rate R=6. (The rate of either code is (Q/T) $\log_2 r$; we achieve R=6 by having the orthogonal design send 256-QAM, and the LD code send 64-QAM.) The decoding in both cases is the efficient form of nulling/cancelling described in U.S. patent application Ser. No. 09/438,900. We see from FIG. 4 that the LD code performs uniformly better. It is worth noting that the matrix S in Eq. (16) has orthogonal columns.

Mathematical Details

Normalization of the dispersion matrices. For purposes of theoretical analysis, we have assumed that the transmit signal S is normalized such that E tr SS*=TM. This induces the following normalization on the matrices $\{A_q, B_q\}$:

$$\sum_{q=1}^{Q} (tr A_q^* A_q + tr B_q^* B_q) = 2TM. \quad (8)$$

Mathematical formulas for use in solving the optimization problem. In this section, we compute the gradient of the cost function of Eq. (14). To help compute this gradient, we rewrite the cost function in Eq. (14) as $$\frac{1}{2T} E \log \quad (17)$$

$$\det\left(I_{2NT} + \frac{\rho}{M} \sum_{q=1}^{Q} \begin{bmatrix} \tilde{A}_q & \cdots & 0 \\ \vdots & \ddots & \vdots \\ 0 & \cdots & \tilde{A}_q \end{bmatrix} \begin{bmatrix} \tilde{H}_1 \\ \vdots \\ \tilde{H}_N \end{bmatrix} \begin{bmatrix} \tilde{H}_1 \\ \vdots \\ \tilde{H}_N \end{bmatrix}^T \begin{bmatrix} \tilde{A}_q & \cdots & 0 \\ \vdots & \ddots & \vdots \\ 0 & \cdots & \tilde{A}_q \end{bmatrix}^T + \right.$$

$$\left. (\tilde{B}_q \leftarrow \tilde{A}_q) \right)$$

where for q=1, ..., Q and n=1, ..., N, we have defined $$\tilde{A}_q = \begin{bmatrix} A_{R,q} & -A_{I,q} \\ A_{I,q} & A_{R,q} \end{bmatrix}, \tilde{B}_q = \begin{bmatrix} -B_{I,q} & -B_{R,q} \\ B_{R,q} & -B_{I,q} \end{bmatrix}, \tilde{H}_n = \begin{bmatrix} h_{R,n} \\ h_{I,n} \end{bmatrix}. \quad (18)$$

The subscript "R" denotes "real part", and "I" denotes "imaginary part".

Define the matrix appearing in the log det(.) of Eq. (17) as Z. That is, $$Z = \left( I_{2NT} + \frac{\rho}{M} \sum_{q=1}^{Q} \begin{bmatrix} \tilde{A}_q & \cdots & 0 \\ \vdots & \ddots & \vdots \\ 0 & \cdots & \tilde{A}_q \end{bmatrix} \begin{bmatrix} \tilde{H}_1 \\ \vdots \\ \tilde{H}_N \end{bmatrix} \begin{bmatrix} \tilde{H}_1 \\ \vdots \\ \tilde{H}_N \end{bmatrix}^T \begin{bmatrix} \tilde{A}_q & \cdots & 0 \\ \vdots & \ddots & \vdots \\ 0 & \cdots & \tilde{A}_q \end{bmatrix}^T + (\tilde{B}_q \leftarrow \tilde{A}_q) \right)$$

Define:

$$P_q = E\left( Z^{-1} \begin{bmatrix} \tilde{H}_1 \\ \vdots \\ \tilde{H}_N \end{bmatrix} [\tilde{H}_1^T \cdots \tilde{H}_N^T] \begin{bmatrix} \tilde{A}_1 & \cdots & 0 \\ \vdots & \ddots & \vdots \\ 0 & \cdots & \tilde{A}_q \end{bmatrix} \right), \quad (19)$$

$$R_q = E\left( Z^{-1} \begin{bmatrix} \tilde{H}_1 \\ \vdots \\ \tilde{H}_N \end{bmatrix} [\tilde{H}_1^T \cdots \tilde{H}_N^T] \begin{bmatrix} \tilde{B}_q & \cdots & 0 \\ \vdots & \ddots & \vdots \\ 0 & \cdots & \tilde{B}_q \end{bmatrix} \right). \quad (20)$$

The gradients of the cost function $$\left[\frac{\partial f(A_{R,q})}{\partial A_{R,q}}\right]_{ij} = \frac{2\rho}{TM} \sum_{n=1}^{N} (P_{q,i+(2n-2)T, j+(2n-2)M} + P_{q,i+(2n-1)T, j+(2n-1)M}) \quad (21)$$

$$\left[\frac{\partial f(A_{I,q})}{\partial A_{I,q}}\right]_{ij} = \frac{2\rho}{TM} \sum_{n=1}^{N} (P_{q,i+(2n-1)T, j+(2n-2)M} - P_{q,i+(2n-2)T, j+(2n-1)M}) \quad (22)$$

$$\left[\frac{\partial f(B_{R,q})}{\partial B_{R,q}}\right]_{ij} = \frac{2\rho}{TM} \sum_{n=1}^{N} (R_{q,i+(2n-1)T, j+(2n-2)M} - R_{q,i+(2n-2)T, j+(2n-1)M}) \quad (23)$$

$$\left[\frac{\partial f(B_{I,q})}{\partial B_{I,q}}\right]_{ij} = \frac{-2\rho}{TM} \sum_{n=1}^{N} (R_{q,i+(2n-2)T, j+(2n-2)M} + R_{q,i+(2n-1)T, j+(2n-1)M}). \quad (24)$$

are given by:

$$f = \frac{1}{2T} E \cdot \log \det Z$$

We claim:

1. A method of transmitting data over a wireless communication channel, wherein data are to be embodied in at least one signal distributed over plural transmit antennas, or over plural time intervals, or both, according to a space-time matrix, the method comprising:
   mapping a block of data to a sequence of symbols, each symbol having a scalar value;
   defining each element of the space-time matrix as a weighted sum of symbols, wherein weights are assigned to each symbol according to a respective dispersion matrix for that symbol, the dispersion matrices do not lead to an orthogonal design, and at least one dispersion matrix is effective for distributing its associated symbol over two or more transmit antennas; and
   transmitting a signal according to the space-time matrix.

2. The method of claim 1, wherein the symbols are selected from a symbol constellation.

3. The method of claim 1, wherein the sequence of symbols comprises complex-valued symbols selected from a constellation and further comprises the complex conjugates of the selected symbols.

4. The method of claim 1, wherein the sequence of symbols comprises real numbers whose amplitudes equal the real parts of elements selected from a constellation, and imaginary numbers whose amplitudes equal the imaginary parts of the selected constellation elements.

5. The method of claim 1, wherein the dispersion matrices are determined by an optimization procedure directed at making the most efficient use of the channel capacity.

6. The method of claim 1, wherein the dispersion matrices are determined by an optimization procedure that seeks to maximize a measure of mutual information between transmitted and received signals.

7. The method of claim 6, wherein the measure of mutual information is derived, in part, from an effective channel matrix $\tilde{H}$ that linearly relates a vector $\tilde{s}$ of real and imaginary parts of selected symbols to a vector $\tilde{x}$ of real and imaginary parts of signals received due to transmission of the selected symbols, the linear relationship having the form $\tilde{x}$=(normalizing factor)$\times\tilde{H}\tilde{s}$+(additive noise vector).

8. The method of claim 7, wherein the measure of mutual information is proportional to a statistical expected value of log det $$\left(I_{2NT} + \frac{\rho}{M} \tilde{H}\tilde{H}^T\right),$$

wherein M is the number of transmit antennas, there are N receiving antennas, there is a measured signal-to-noise ratio of $\rho$, the signal to be transmitted is distributed over T time intervals, $I_{2NT}$ is the identity matrix of dimension 2NT, and $\tilde{H}^T$ is the conjugate transpose of $\tilde{H}$.

9. The method of claim 6, wherein the measure of mutual information is derived from an effective channel matrix $\tilde{H}$, each element of $\tilde{H}$ is a weighted sum of real and imaginary parts of measured channel coefficients, and in each said element, the weights are real and imaginary parts of elements of dispersion matrices.

10. The method of claim 9, wherein the measure of mutual information is proportional to a statistical expected value of log det $$\left(I_{2NT} + \frac{\rho}{M} \tilde{H}\tilde{H}^T\right),$$

wherein M is the number of transmit antennas, there are N receiving antennas, there is a measured signal-to-noise ratio of $\rho$, the signal to be transmitted is distributed over T time intervals, $I_{2NT}$ is the identity matrix of dimension 2NT, and $\tilde{H}^T$ is the conjugate transpose of $\tilde{H}$.

* * * * *